(12) United States Patent
Miyauchi et al.

(10) Patent No.: US 11,549,550 B2
(45) Date of Patent: Jan. 10, 2023

(54) INTERNAL COMBUSTION ENGINE

(71) Applicant: Mazda Motor Corporation, Hiroshima (JP)

(72) Inventors: Yuma Miyauchi, Aki-gun (JP); Runa Suzuki, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/723,076

(22) Filed: Apr. 18, 2022

(65) Prior Publication Data

US 2022/0381289 A1  Dec. 1, 2022

(30) Foreign Application Priority Data

May 25, 2021  (JP) .............................. JP2021-087815

(51) Int. Cl.
```
F01M 1/02      (2006.01)
F16C 3/14      (2006.01)
F01M 1/06      (2006.01)
F01M 11/02     (2006.01)
F16C 9/02      (2006.01)
```

(52) U.S. Cl.
CPC ................ *F16C 3/14* (2013.01); *F01M 1/06* (2013.01); *F01M 2011/026* (2013.01); *F16C 9/02* (2013.01); *F16C 2360/22* (2013.01)

(58) Field of Classification Search
CPC .... F16C 3/14; F16C 9/02; F01M 1/06; F01M 2011/026; F01M 2001/062

USPC ...................................................... 123/196 R
See application file for complete search history.

(56) References Cited

U.S. PATENT DOCUMENTS

| | | | |
|---|---|---|---|
| 10,072,699 B2* | 9/2018 | Uesu .................... | F01M 1/06 |
| 2014/0260787 A1* | 9/2014 | Kumar .................. | C21D 9/30 |
| | | | 29/888.08 |
| 2017/0261029 A1* | 9/2017 | De Rooij ............. | F16C 33/105 |
| 2018/0347411 A1* | 12/2018 | Asakura ................ | F01L 1/047 |
| 2020/0370594 A1* | 11/2020 | Yamaguchi ........... | F16C 9/02 |

FOREIGN PATENT DOCUMENTS

JP         2021025653 A      2/2021

* cited by examiner

*Primary Examiner* — Long T Tran
*Assistant Examiner* — James J Kim
(74) *Attorney, Agent, or Firm* — Alleman Hall Creasman & Tuttle LLP

(57) ABSTRACT

An internal combustion engine is provided, which includes an engine body provided with a cylinder and a piston reciprocatably accommodated in the cylinder, a crankshaft that converts reciprocating movement of the piston into rotational movement, and a bearing member pivotally supporting the crankshaft via lubricating oil. The crankshaft includes a crank journal pivotally supported by the bearing member, and a counterweight extending radially outward from an axial end part of the crank journal. The crank journal has a recess formed in a part thereof corresponding to the extended position of the counterweight, the recess being depressed radially inwardly. The recess is deeper at the axial end part of the crank journal than an axial center part.

20 Claims, 12 Drawing Sheets

INTERNAL COMBUSTION ENGINE

TECHNICAL FIELD

The present disclosure relates to an internal combustion engine having a structure in which a crank journal of a crankshaft is pivotally supported by a bearing member via lubricating oil.

BACKGROUND OF THE DISCLOSURE

Internal combustion engines are each provided with a crankshaft which converts reciprocating movement of a piston reciprocatably accommodated in a cylinder into rotational movement. Crank journals of the crankshaft are each pivotally supported by a slide bearing via lubricating oil. JP2021-025653A discloses an internal combustion engine in which a plurality of recesses are formed in an outer surface of a crank journal to increase the retention of lubricating oil.

Meanwhile, in order to improve the fuel efficiency of the internal combustion engine, various kinds of mechanical losses need to be reduced. Further, in terms of suppressing friction loss of the sliding surface, it is desirable to use low-viscosity oil as the lubricating oil. However, when the low-viscosity oil is used, poor lubrication may occur in the bearing parts of the crank journals, and therefore, wear may occur in the crank journals. Further, since the crankshaft is pressed in a direction which intersects with the axial direction when the piston receives combustion pressure, a deforming force acts on the crankshaft. Therefore, wear due to the deformation of the crank journal itself may also become a problem.

SUMMARY OF THE DISCLOSURE

Thus, one purpose of the present disclosure is to provide an internal combustion engine, capable of suppressing wear of a crank journal accompanying a deformation of a crankshaft, while maintaining lubrication in a bearing part of the crank journal.

According to one aspect of the present disclosure, an internal combustion engine is provided, which includes an engine body provided with a cylinder and a piston reciprocatably accommodated in the cylinder, a crankshaft that converts reciprocating movement of the piston into rotational movement, and a bearing member pivotally supporting the crankshaft via lubricating oil. The crankshaft includes a crank journal pivotally supported by the bearing member, and a counterweight extending radially outward from an axial end part of the crank journal. The crank journal has a recess formed in a part thereof corresponding to an extended position of the counterweight, and depressed radially inwardly. The recess is deeper at the axial end part of the crank journal than an axial center part.

When the piston receives combustion pressure, a pressing force acts on the crankshaft in a direction which intersects with the axial direction. Meanwhile, the counterweight is a considerable heavy object, and is generally disposed at a position opposite from the coupling part of the piston with the crankshaft in order to reduce a force of inertia. Thus, when the pressing force from the piston is applied to the crankshaft, a deforming force (load) occurs so that the counterweight is bent toward the crank journal. The deforming force acts in such a direction that a circumferential surface of the crank journal corresponding to the extended position of the counterweight is brought close to the bearing member. That is, a state in which the circumferential surface of the crank journal is easily able to contact the bearing member at the extended position of the counterweight, is formed.

According to this configuration, the recess is formed in the part corresponding to the extended position of the counterweight, and is deeper at the axial end part of the crank journal than the axial center part. Thus, even if the pressing force from the piston is applied, a clearance between the circumferential surface of the crank journal corresponding to the extended position of the counterweight and the bearing member is secured by the recess, and therefore, the contact therebetween can be avoided. On the other hand, in an area without the recess, the clearance between the circumferential surface of the crank journal and the bearing member can be set small. Therefore, even if low-viscosity oil is used as the lubricating oil, the oil is unlikely to leak, thereby securing lubrication. Thus, it is possible to achieve both retention of the lubrication in the bearing member of the crank journal, and prevention of wear of the crank journal.

The recess may become gradually deeper from the axial center part of the crank journal toward the axial end part.

When the pressing force from the piston is applied to the crankshaft, at the extended position of the counterweight, the axial end part of the crank journal is most deformed in the direction approaching to the bearing member, and the deformation decreases as it goes toward the axial center. According to this configuration, the recess can have a depth distribution which matches with the deformation mode of the crank journal, and therefore, the securing of the lubrication and the wear prevention can be achieved more suitably.

The recess may have a given axial width and a given circumferential width in the axial direction and in the circumferential direction of the crank journal, respectively. The axial width of the recess may be wider at an upstream side in the rotational direction of the crankshaft than at a downstream side.

Particularly, a plan view shape of the recess in a plane in which the crank journal is developed in the circumferential direction may have a bulged part bulged toward the axial center part with a tight curve near an upstream end in the rotational direction of the circumferential width, and a gradual-curve part with a gradual curve from the bulged part to a downstream end in the rotational direction of the circumferential width.

The present inventors' analysis revealed that the load which acts on the crank journal by the bending of the counterweight has a tendency to be larger in the upstream part in the rotational direction than the downstream part, at the extended position of the counterweight. In more detail, it is found that the largest load is applied near the upstream end in the rotational direction, and the load decreases gradually as it goes toward the downstream end in the rotational direction. According to this configuration, the recess can have the axial width which meets such a load tendency, and therefore, the contact between the crank journal and the bearing member can be prevented more securely.

The recess may be deeper in the axial end part as the axial width becomes wider.

According to this configuration, at the part of the recess with the wide axial width, the clearance with the bearing member can be set large. The part of the recess with the wide axial width and the deep depression is disposed at the part of the crank journal where it receives the largest bending load from the counterweight. Therefore, the contact wear of the crank journal can be securely avoided.

The recess may have a given axial width and a given circumferential width in the axial direction and in the circumferential direction of the crank journal, respectively. The recess may have a depth profile in which the depth becomes deeper at a first inclination from the upstream end in the rotational direction of the circumferential width toward the downstream side, a deepest part is formed upstream of the center part in the rotational direction, and the depth becomes shallower at a second inclination from the deepest part toward the downstream end in the rotational direction, the first inclination being larger than the second inclination.

According to the present inventors' analysis, energy loss due to direct contact between the crank journal and the bearing member accompanying the deformation of the crankshaft presents a characteristic in which it rises comparatively steeply during the first half of the contact, and descends comparatively gradually in the second half. Since the direct contact becomes a factor of the wear of the crank journal, the wear is major in the first half of the contact and minor in the second half. Therefore, by forming in the crank journal the recess having the depth profile described above, it can be a measure against the contact wear adapted to the energy loss characteristic described above.

The engine may have a plurality of cylinders lined up in a given arrangement direction. The crank journal located between two cylinders may include a first counterweight extending radially outward from one end part in the axial direction, a second counterweight extending radially outward from the other end part in the axial direction, at a position opposite from or at the same position as the first counterweight in the circumferential direction, a first recess formed in a part corresponding to the extended position of the first counterweight, and depressed from one end part in the axial direction toward the center in the axial direction, and a second recess formed in a part corresponding to the extended position of the second counterweight, and depressed from the other end part in the axial direction toward the center in the axial direction.

According to this configuration, it is possible to achieve both the lubrication retention and the wear prevention for the crank journal of the crankshaft having a full counter type counterweight. In this configuration, when the combustion pressure is applied to the piston, a deformation behavior occurs so that a space between the first counterweight and the second counterweight which are disposed to sandwich the crank journal decreases. The contact between the crank journal and the bearing member accompanying such a deformation behavior can be prevented beforehand by forming the first recess and the second recess.

The engine may have a plurality of cylinders lined up in a given arrangement direction. The crank journal located axially outward of the cylinder on the one end side or the other end side in the arrangement direction may include an end counterweight extending radially outward from an inward end in the axial direction, and an arrangement end recess formed in a part corresponding to the extended position of the end counterweight, and depressed outward in the axial direction from the inward end.

As for the crankshaft having the full counter type counterweight, the crank journal which is located axially outward of the cylinder on the one end side or the other end side in the arrangement direction is provided only with the end counterweight extending from the inward end in the axial direction. According to this configuration, the crank journal located at the end part of the crankshaft is provided only with the arrangement end recess corresponding to the end counterweight. Therefore, large clearance is not unnecessarily formed between the crank journal and the bearing member, and it is possible to achieve both the lubrication retention and the wear prevention of the crank journal.

DETAILED DESCRIPTION OF THE DISCLOSURE

Figure 1:
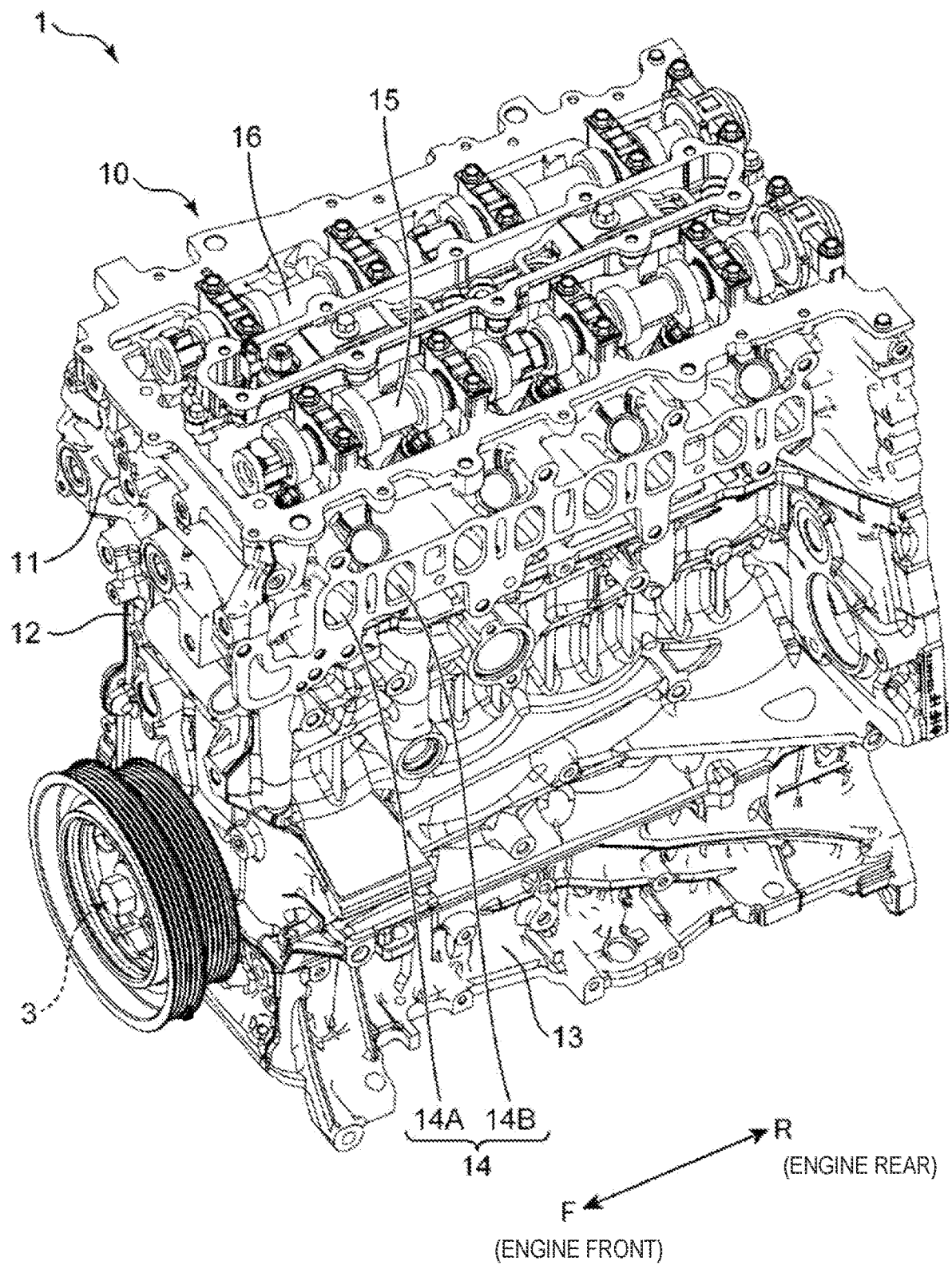
FIG. 1 is a perspective view illustrating the appearance of an engine which is one example of an internal combustion engine according to the present disclosure.
Figure 2:
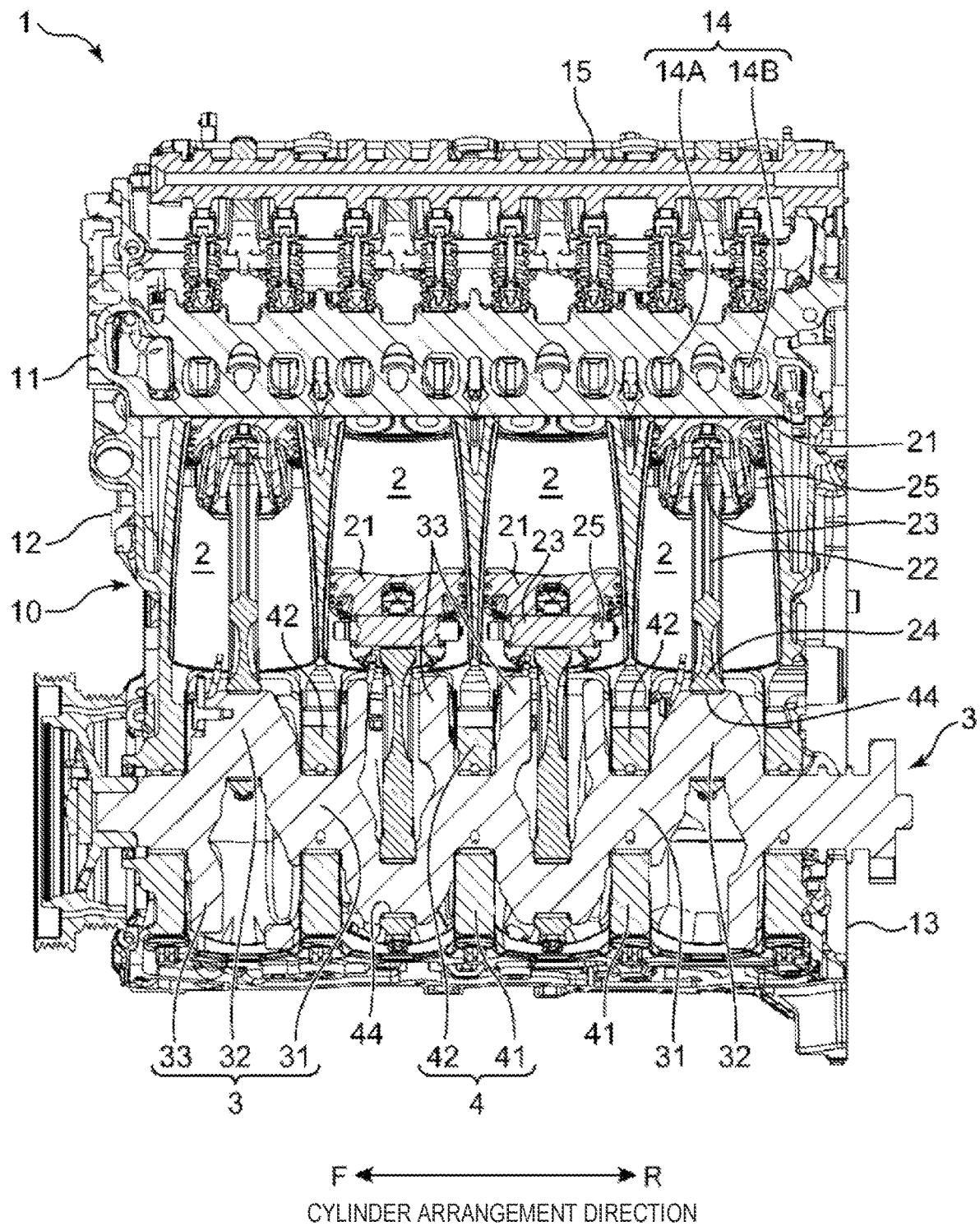
FIG. 2 is a longitudinal cross-sectional view of the engine in the cylinder lined-up direction.

Hereinafter, an internal combustion engine according to one embodiment of the present disclosure is described in detail with reference to the accompanying drawings. In this embodiment, an engine which is mounted on a vehicle, such as an automobile, as a power source for propelling the vehicle is illustrated as one example of the internal combustion engine. Engine Structure FIG. 1 is a perspective view illustrating the appearance of an engine 1 according to this embodiment. FIG. 2 is a longitudinal cross-sectional view of the engine 1 in a cylinder lined-up direction. The engine 1 is a four-stroke, in-series four-cylinder engine. In FIG. 1 and some other drawings, directional indications of "F" and "R" which respectively indicate "forward" and "rearward" of the engine 1 are given. The engine 1 includes an engine body 10, a crankshaft 3 incorporated into the engine body 10, and main bearings 4 which pivotally support the crankshaft 3.

The engine body 10 includes a cylinder block 11, a cylinder head 12, and a lower cylinder block 13. The cylinder block 11 has four cylinders 2 lined up in the engine front-and-rear direction F-R (given arrangement direction). A piston 21 is reciprocatably accommodated inside each cylinder 2. The cylinder block 11 may include more cylinders 2, and, for example, it may be for an in-series six-cylinder engine.

The cylinder head 12 is attached to an upper surface of the cylinder block 11, and closes an upper opening of the cylinder 2. In the cylinder head 12, intake ports 14 which take intake air into the cylinders 2, and exhaust ports which do not appear in FIGS. 1 and 2 are formed. Each cylinder 2 is connected to an intake system and an exhaust system in a four-valve type of two intake valves and two exhaust valves. In FIGS. 1 and 2, four pairs of intake ports 14, each pair being comprised of a first intake port 14A and a second intake port 14B, are lined up in the cylinder arrangement direction. An intake-valve cam shaft 15 which operates the intake valves, and an exhaust-valve cam shaft 16 which operates the exhaust valves are also incorporated into the cylinder head 12. A cylinder head cover (not illustrated) is attached to an upper surface of the cylinder head 12.

The lower cylinder block 13 is a block which is attached to a lower surface of the cylinder block 11, and supports the crankshaft 3. The lower cylinder block 13 has a ladder frame structure in which parts which support the crankshaft 3 are lined up in the engine front-and-rear direction.

Figure 3:
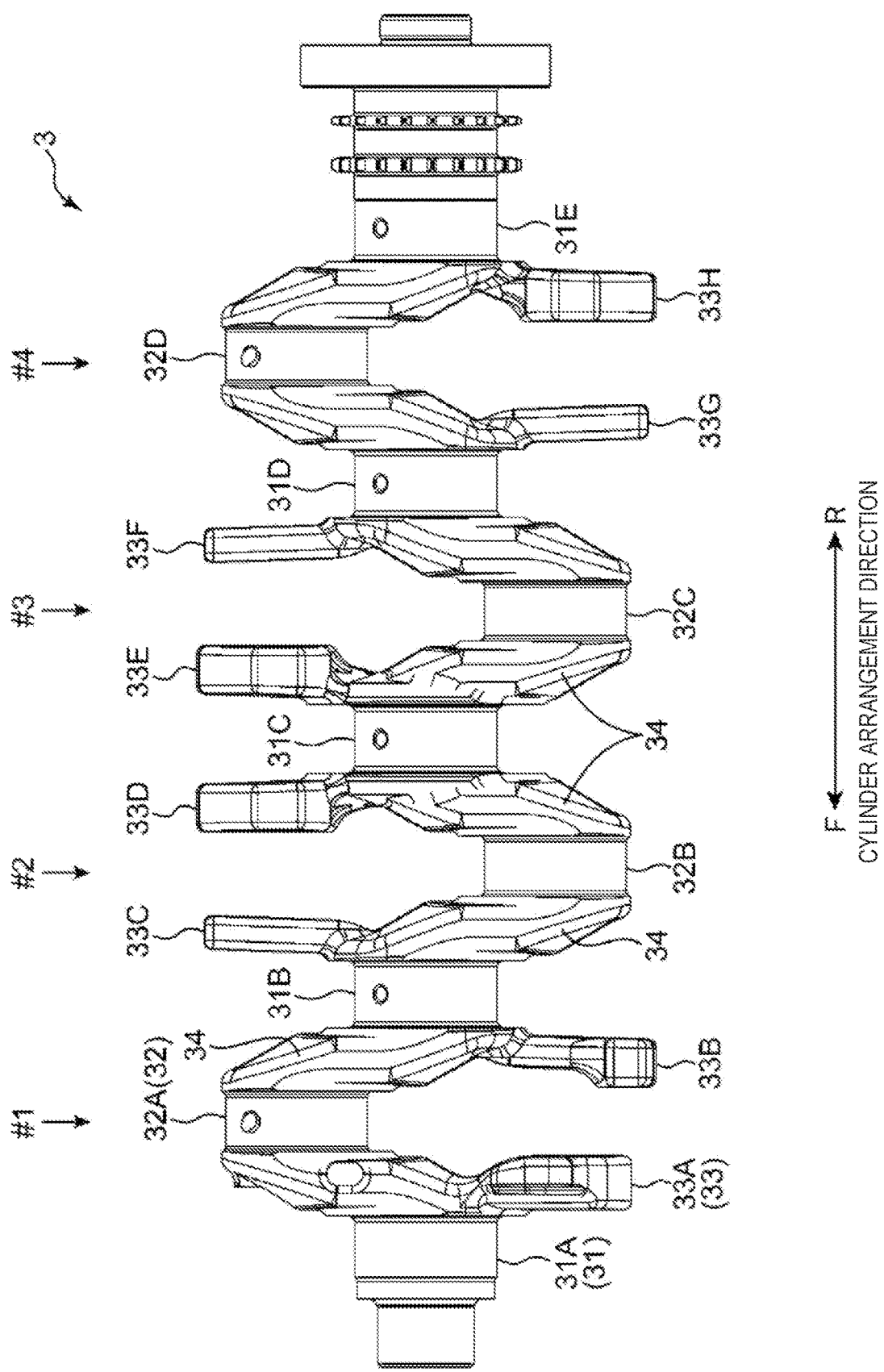
FIG. 3 is a side view of a crankshaft of a 4-cylinder engine.

The crankshaft 3 is a rotational output shaft of the engine 1 which converts reciprocating movement of the piston 21 into rotational movement. FIG. 3 is a side view of the crankshaft 3, and the illustrated phase in the rotational direction is the same as that of the cross-sectional view of FIG. 2. The crankshaft 3 includes crank journals 31, crank pins 32, counterweights 33, and crank arms 34. The crankshaft 3 illustrated here is of a full counterweight type.

The crank journals 31 are a part used as a rotation shaft of the crankshaft 3, and is a part pivotally supported by the main bearing 4. The crank pins 32 are a part coupled to the piston 21 via a connecting rod 22. The connecting rod 22 is provided with a small-end part 23 at an upper-end side, and a large-end part 24 at a lower-end side. The small-end part 23 is coupled to the piston 21 via a piston pin 25. The large-end part 24 is coupled to the crank pins 32. The crank arms 34 are a part which connects the crank journal 31 to the crank pin 32.

The counterweights 33 are members that reduces a force of inertia accompanying the movement of the piston 21 and the connecting rod 22. The counterweights 33 are disposed so as to extend radially outward from an end part of the crank journals 31 in an axial direction (F-R direction). A position in the circumferential direction where the counterweights 33 is disposed is opposite from the crank pins 32. In other words, the counterweights 33 extends radially outward from a part of the crank arms 34 on the opposite side of the part coupled to the crank pins 32.

The crankshaft 3 is adapted to the in-series four-cylinder engine 1. Arrows #1, #2, #3, and #4 illustrated in FIG. 3 indicate positions where the connecting rods 22 of the four cylinders 2 are disposed. The #1 cylinder 2 is a cylinder at the leading-end side (one end side) in the axial direction (cylinder arrangement direction), and the #4 cylinder 2 is a cylinder at the trailing-end side (other end side) in the cylinder arrangement direction. Corresponding to the #1 to #4 cylinders 2, the crankshaft 3 is provided with first, second, third, and fourth crank pins 32A, 32B, 32C, and 32D as the crank pins 32.

As the crank journals 31, a first crank journal 31A located at the F-side in the axial direction of the #1 cylinder 2, second, third, and fourth crank journals 31B, 31C, and 31D located between the respective first to fourth crank pin 32A-32D, and a fifth crank journal 31E located at the R-side in the axial direction of the #4 cylinder 2. As the counterweights 33, first and second counterweights 33A and 33B are disposed so as to sandwich the first crank pin 32A, third and fourth counterweights 33C and 33D are disposed so as to sandwich the second crank pin 32B, fifth and sixth counterweights 33E and 33F are disposed so as to sandwich the third crank pin 32C, and seventh and eighth counterweights 33G and 33H are disposed so as to sandwich the fourth crank pin 32D, are provided.

Each main bearing 4 includes a journal support part 41 and a cap 42. The journal support part 41 is a cavity part having a semicircle shape, which is formed in each of a plurality of frames disposed at the lower cylinder block 13 in the ladder fashion, and supports the crank journal 31 from the lower part. The cap 42 is a recess part having a semicircle shape attached to each journal support part 41 so as to cover the journal support part 41 from above. The crank journal 31 is held by a pivotal support which is created by engaging the journal support part 41 with the cap 42.

A journal metal 43 (bearing member) intervenes between the journal support part 41 and the cap 42, and the crank journal 31. The journal metal 43 is a slide bearing, and is a bearing member which directly and pivotally supports an outer circumferential surface of the crank journal 31 via lubricating oil. The journal metal 43 is a two-piece ring body which is comprised of a combination of semi-circular metal pieces. Lubricating oil is supplied between an inner circumferential surface of the journal metal 43 and the outer circumferential surface of the crank journal 31. When the crankshaft 3 (crank journal 31) rotates on the axis, oil film pressure of the lubricating oil occurs, and this oil film supports the rotation of the crank journal 31.

Also between the large-end part 24 of the connecting rod 22 and the crank pin 32, a connecting rod metal 44 which is comprised of a slide bearing similar to the journal metal 43 intervenes. Lubricating oil is also supplied between an inner circumferential surface of the connecting rod metal 44 and an outer circumferential surface of the crank pin 32.

Load Applied to Crank Journal

Figure 4:
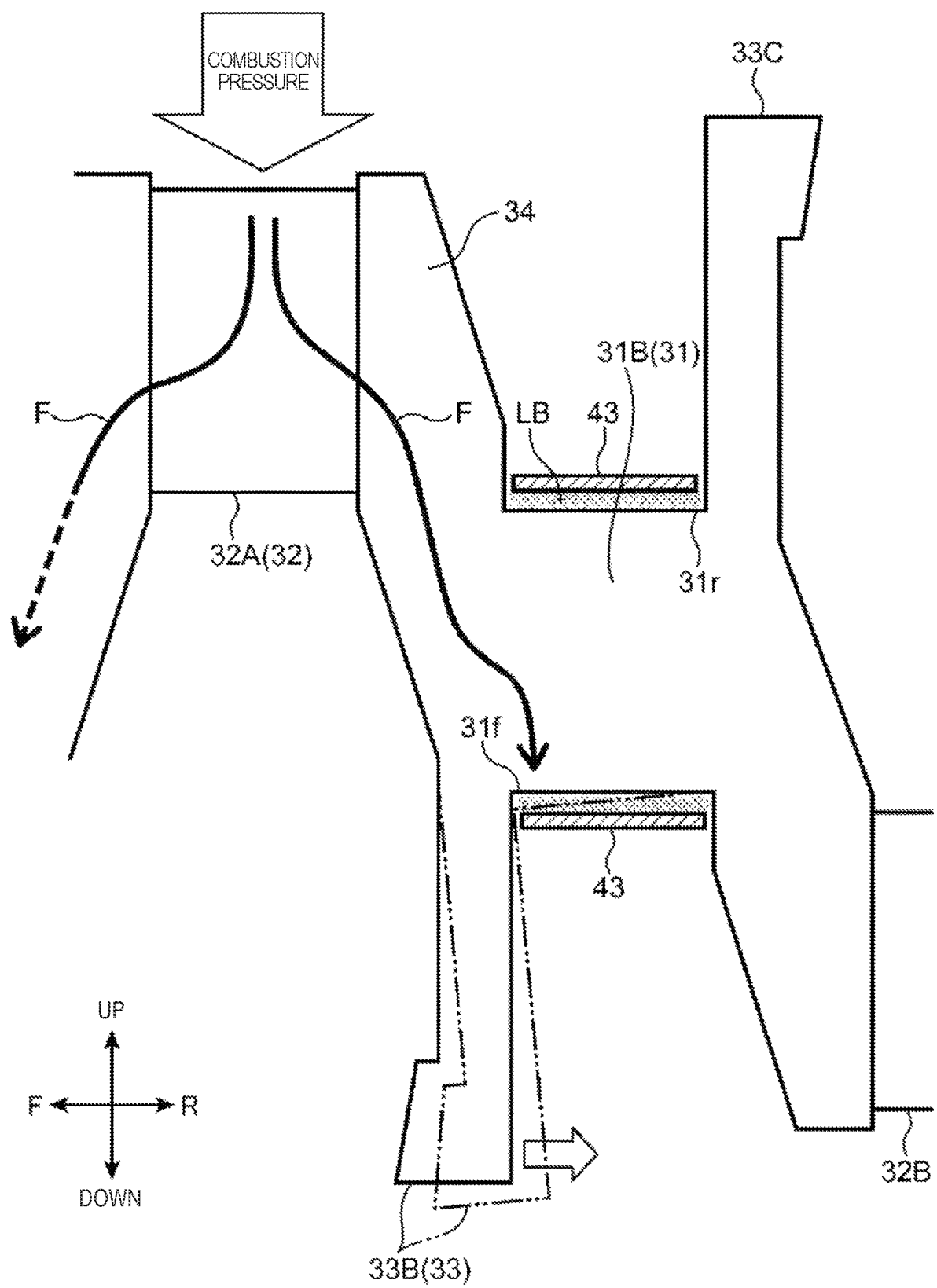
FIG. 4 is a schematic diagram illustrating a deformation of a crank journal.

Next, load applied to the crank journal 31 during the rotation of the crankshaft 3 is described. FIG. 4 is a schematic diagram in which the first crank pin 32A (crank pin 32) and the second crank journal 31B (crank journal 31) of FIG. 3 are enlarged, and is a view where the cross section of the journal metal 43 is added. As described above, a state where an oil film LB of the lubricating oil is formed between the journal metal 43 and the second crank journal 31B is illustrated.

The second crank journal 31B is a crank journal located between the #1 cylinder 2 and the #2 cylinder 2 (see FIG. 3). From an F-side end part 31f (one end part in the axial direction) of the second crank journal 31B, the second counterweight 33B extends downwardly and radially outwardly. On the other hand, at the position which is 180° opposite from the second counterweight 33B in the circumferential direction, the third counterweight 33C extends upwardly and radially outwardly from an R-side end part 31r (the other end part in the axial direction) of the second crank journal 31B. Note that the fourth and fifth counterweights 33D and 33E which extend radially outwardly from the F-side end part 31f and the R-side end part 31r of the third crank journal 31C are one example of a counterweight pair which is disposed at the same circumferential position.

The combustion pressure which is received by the piston 21 of the #1 cylinder 2 is inputted into the first crank pin 32A from the large-end part 24 of the connecting rod 22. An arrow of FIG. 4 schematically illustrates a line of force F when the combustion pressure is applied to the first crank pin 32A. The line of force F passes through the crank arm 34 from the first crank pin 32A, and goes toward the second crank journal 31B. When the combustion pressure is applied to the second crank journal 31B along the line of force F, a deforming force (load) occurs so that the second counterweight 33B which is located at the opposite position from the first crank pin 32A is bent toward the second crank journal 31B. In other words, the deforming force occurs so that an interval between the first counterweight 33A (FIG. 3) and the second counterweight 33B which are disposed on both sides of the first crank pin 32A is expanded. In FIG. 4, such a deformation of the second counterweight 33B is illustrated in an exaggerated manner by a two-dot chain line.

The deforming force acts in such a direction that an outer circumferential surface of the second crank journal 31B corresponding to the extended position of the second counterweight 33B (i.e., an outer circumferential surface near the F-side end part 31f) is brought close to the inner circumferential surface of the journal metal 43. That is, at the extended position of the second counterweight 33B, a state where the F-side end part 31f of the second crank journal 31B is easy to contact the journal metal 43 is formed.

In order to suppress the mechanical resistance, it is desirable to reduce the gap between the crank journal 31 and the journal metal 43 to reduce the thickness of the oil film LB as much as possible. However, if the gap is reduced, the crank journal 31 contacts the journal metal 43 because of the deformation of the crank journal 31 resulting from the load of combustion pressure being applied, and an increase in the mechanical resistance and a stimulation of the wear may be invited on the contrary.

Figure 5:
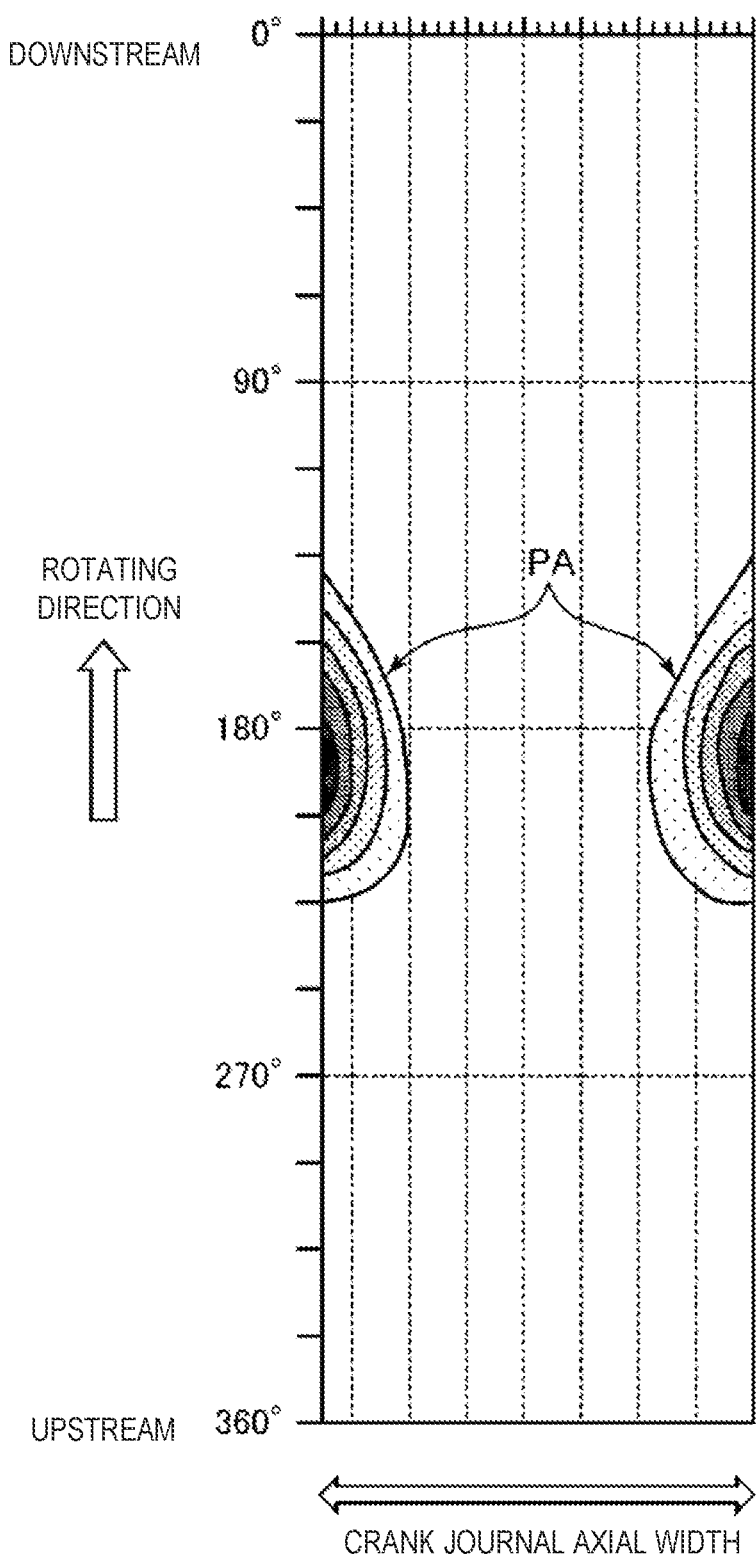
FIG. 5 is a graph illustrating a load applied to the crank journal by combustion pressure.

FIG. 5 is a graph illustrating one example of a measurement of the load applied to the crank journal 31 by the combustion pressure. This graph illustrates a concentration distribution of the load applied to the outer circumferential surface of the crank journal 31, where the outer circumferential surface is illustrated as being developed. A deeper concentration indicates a higher load acting thereto. The horizontal axis of the graph corresponds to the axial width of the crank journal 31, and the vertical axis corresponds to the circumferential width. Further, the rotational direction of the crank journal 31 is added to the vertical axis. The crank journal 31 illustrated in FIG. 5 assumes the third crank journal 31C in which the fourth and fifth counterweights 33D and 33E extend from the same circumferential position.

A high load part PA occurs near 180° in the rotational direction. At near 180° in the rotational direction, the fourth and fifth counterweights 33D and 33E are located below, and the combustion pressure is applied to the second and third crank pins 32B and 32C. It can be seen from FIG. 5 that the high load acts on the third crank journal 31C from the fourth and fifth counterweights 33D and 33E at such a timing in the rotational direction.

The high load part PA does not have a load distribution which draws simple semicircular contour lines, but provides a drop-shaped load distribution in which its center of gravity is eccentric to upstream in the rotational direction. This is considered to be depended on that a large combustion pressure caused by combustion which mainly occurs near a compression top dead center inside the cylinder 2 is applied to the third crank journal 31C all at once via the piston 21 and the connecting rod 22. That is, at the upstream side of the high load part PA in the rotational direction to which the combustion pressure is applied all at once, the load applied to the third crank journal 31C becomes comparatively large. Then, as the rotation advances and it goes toward downstream in the rotational direction, the load becomes gradually smaller. Naturally, in the high load part PA, at the upstream side in the rotational direction to which the larger load is applied, the deformation of the third crank journal 31C becomes larger. That is, at the upstream side in the rotational direction, the third crank journal 31C becomes in a state where it is easier to approach the journal metal 43.

Crank Journal of This Embodiment

Figure 6A:
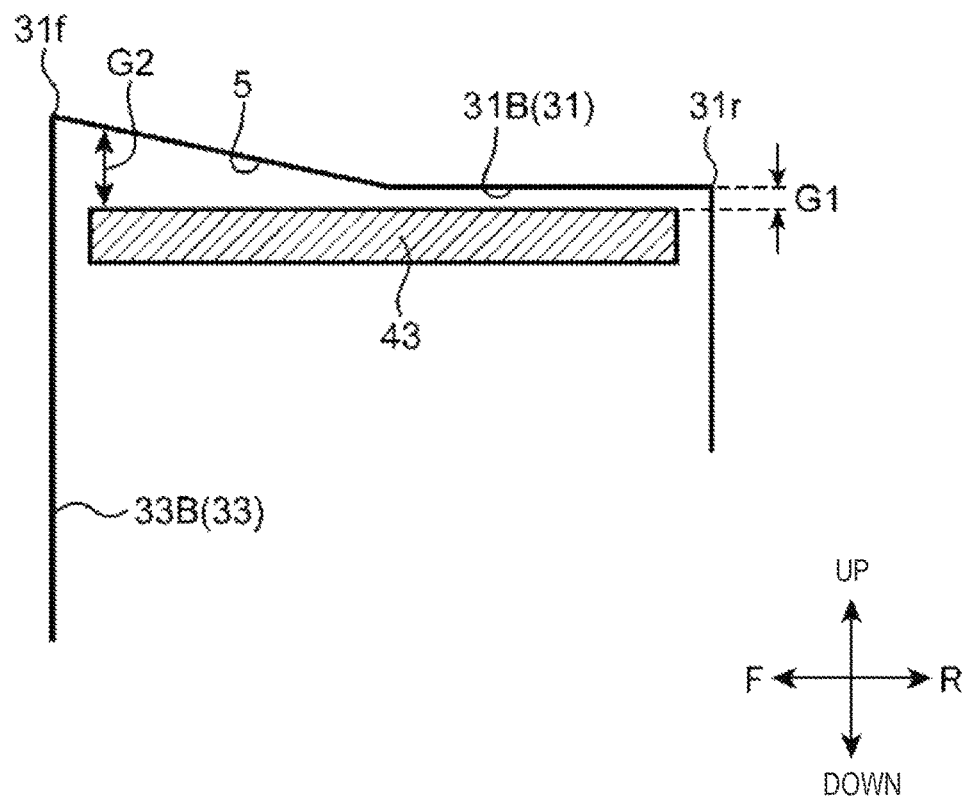
FIG. 6A is a simplified cross-sectional view illustrating one example of a recess which is formed in the crank journal.
Figure 6B:
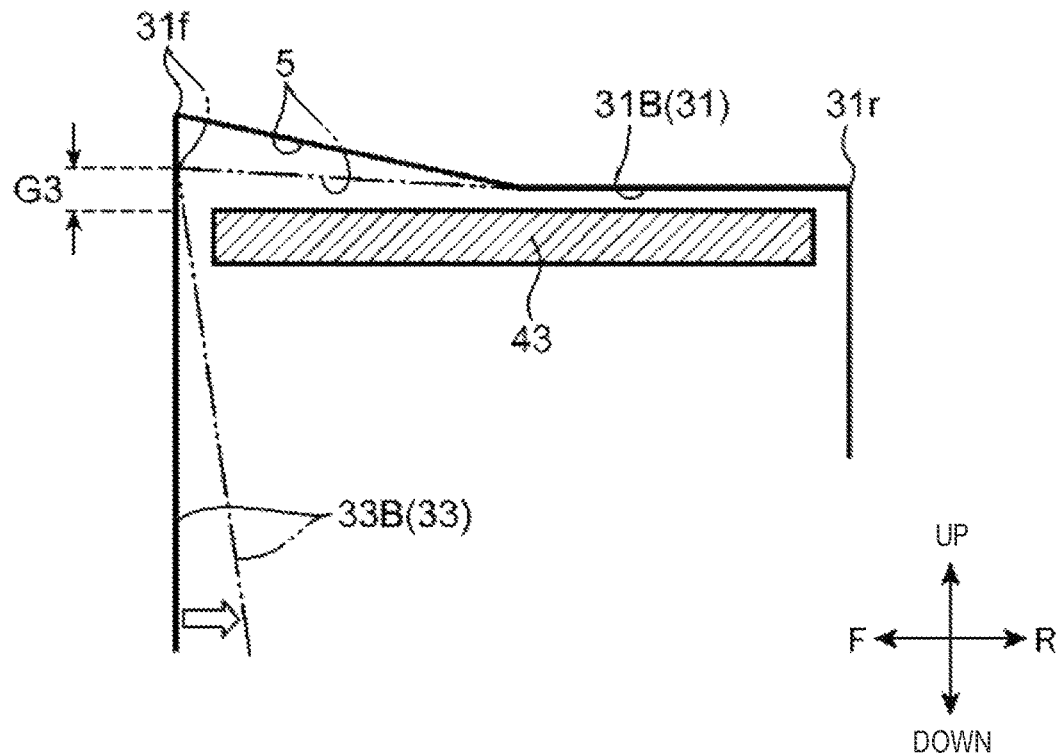
FIG. 6B is a view illustrating operation of the recess.

In this embodiment, one example of the crank journal 31 which is configured so that, even if the high load part PA occurs, the contact of the crank journal 31 with the journal metal 43 can be avoided, without spoiling the retention of the lubricating oil, is illustrated. As illustrated in FIGS. 6A and 6B, the crank journal 31 of this embodiment is provided with a recess 5 which is depressed radially inwardly. The recess 5 is formed in a part corresponding to the extended position of the counterweight 33. The recess 5 is a recess of the crank journal 31 where it is deeper at an axial end part than an axial center part.

FIG. 6A is a simplified cross-sectional view illustrating one example of the recess 5 formed in the second crank journal 31B (crank journal 31), and FIG. 6B is a view illustrating operation of the recess 5. As illustrated in FIG. 4, in the second crank journal 31B, the high load part PA as illustrated in FIG. 5 occurs near the extended position of the second counterweight 33B in the F-side end part 31f. The recess 5 is formed so that a part of the second crank journal 31B corresponding to the extended position is depressed.

The recess 5 has a cross-sectional shape having an inclination where the depth becomes gradually deeper from the axial center part of the second crank journal 31B toward the F-side end part 31f (axial end part). That is, the recess 5 is depressed the deepest radially inward in the F-side end part 31f. As described in the load distribution of FIG. 5, this is because, when the combustion pressure is applied, the load near the extended position of the second counterweight 33B in the F-side end part 31f becomes the largest (that is, the deformation near the F-side end part 31f becomes the largest). Note that in FIGS. 6A and 6B, the depth of the recess 5 is exaggerated, and the depth of the deepest part of the actual recess 5 is from about several microns to about tens of microns.

In FIG. 6A, clearances G1 and G2 between the inner circumferential surface of the journal metal 43 and the outer circumferential surface of the second crank journal 31B are illustrated. The clearance G1 at a part closer to the R-side end part 31r where the recess 5 is not formed is set as a standard clearance which is set in consideration of the viscosity of lubricating oil of the slide bearing etc. On the other hand, the clearance G2 at a part closer to the F-side end part 31f where the recess 5 is formed is larger than G1, and it is the largest near the F-side end part 31f.

FIG. 6B illustrates, by two-dot chain lines, a deformation of the second counterweight 33B and the second crank journal 31B when the combustion pressure is applied. When the combustion pressure is applied to the first crank pin 32A, the second counterweight 33B is deformed so as to be bent toward the R-side end part 31r of the second crank journal 31B. In response to this, a part of the second crank journal 31B closer to the F-side end part 31f is deformed in a direction approaching to the journal metal 43.

When such a deformation occurs, near the F-side end part 31f of the second crank journal 31B may contact the journal metal 43, if the recess 5 does not exist. However, if the recess 5 exists, a clearance G3 between the second crank journal 31B and the journal metal 43 is secured, even after the deformation occurs, and therefore, the contact between them can be avoided.

The recess 5 is not formed in the entire circumference of the part of the second crank journal 31B closer to the F-side end part 31f, but it is formed so that only the part corresponding to the high load part PA is depressed. Forming the recess 5 in the second crank journal 31B expands the clearance with the opposing journal metal 43, which causes an oil leak in which lubricating oil leaks from the clearance. In this embodiment, the recess 5 is formed only in the part corresponding to the high load part PA, and in the area where the recess 5 is not formed, the standard clearance G1 is set between the circumferential surface of the second crank journal 31B and the journal metal 43. Therefore, the oil leak can be minimized.

Further, as illustrated by the two-dot chain line in FIG. 4, when the combustion pressure is applied to the first crank pin 32A, the F-side end part 31f is most deformed in the direction approaching to the journal metal 43, and the deformation decreases as it goes toward the axial center. The recess 5 has such a profile to match with the deformation tendency that the depth becomes gradually deeper from the axial center part of the second crank journal 31B toward the F-side end part 31f. Also in this regard, the devise is made for preventing that the clearance expands unintentionally. Therefore, for example, even if low-viscosity oil of 0W20 class is used as the lubricating oil, it is difficult to cause the oil leak, thereby securing the lubrication. Thus, it is possible to achieve both the lubrication retention in the journal metal 43, and the wear prevention of the crank journal 31.

Layout and Concrete Shape of Recess

Figure 7:
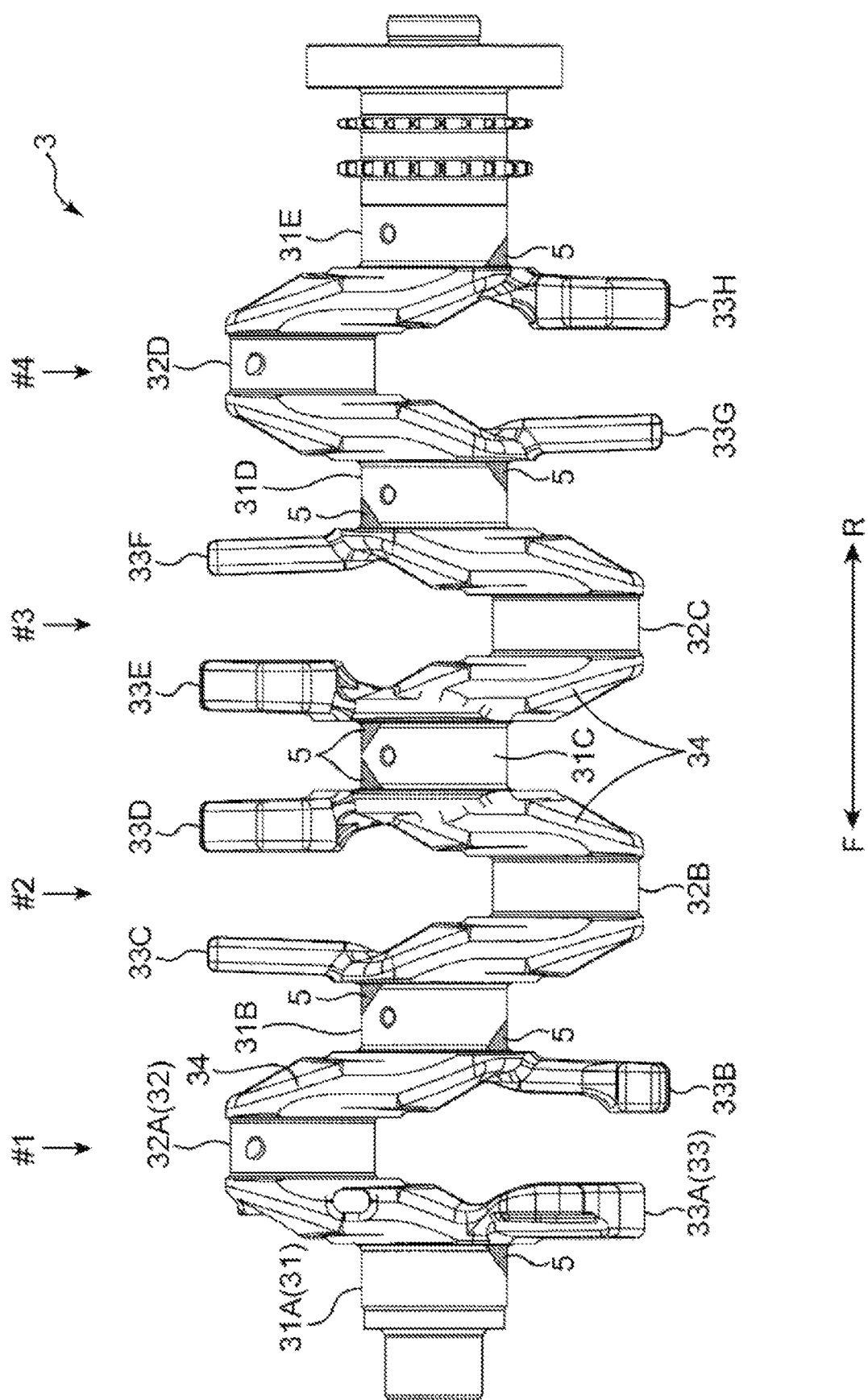
FIG. 7 is a side view of the crankshaft where the layout of the recess is additionally indicated.
Figure 8:
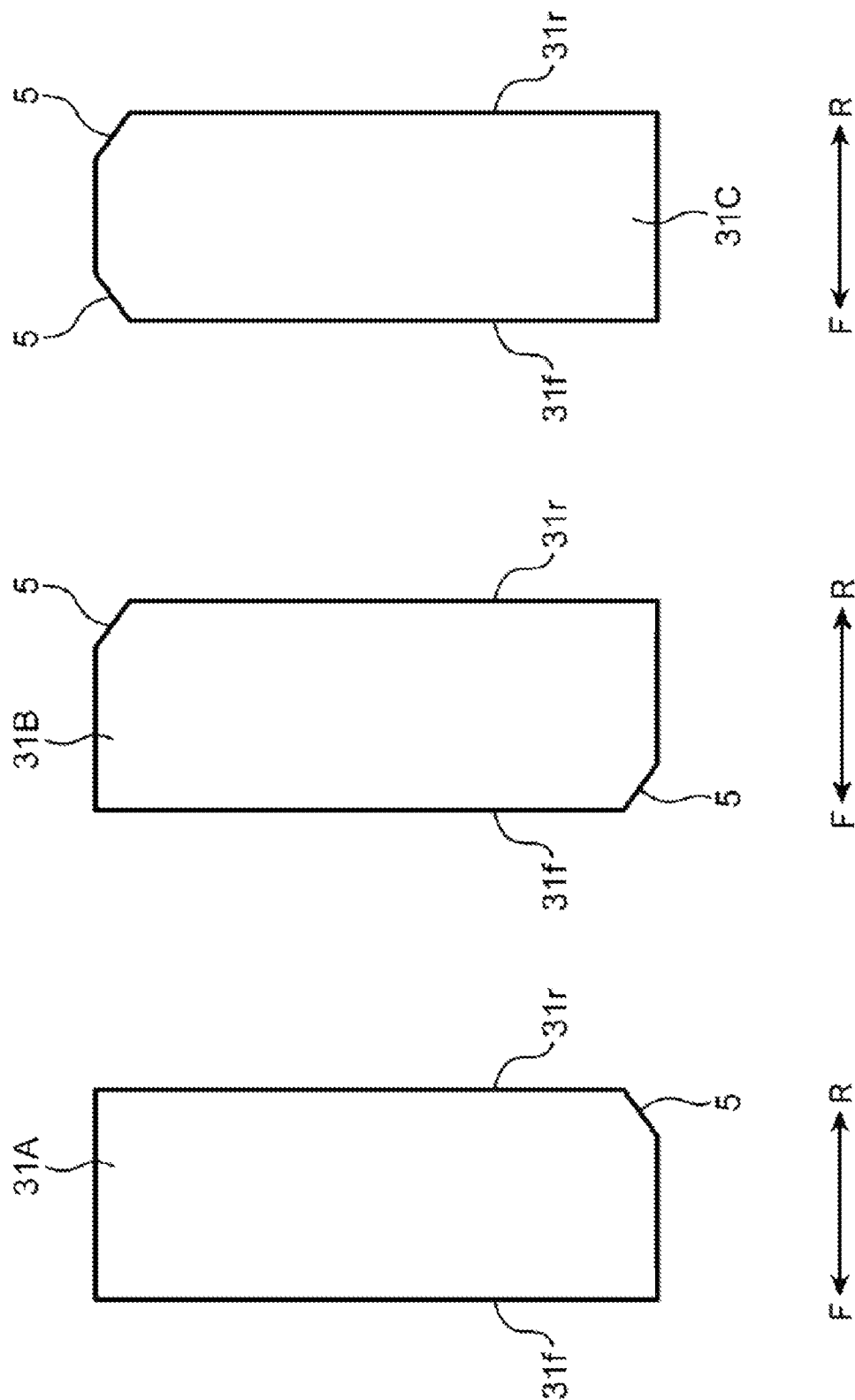
FIGS. 8A to 8C are side views illustrating concrete examples of the crank journal having the recess.

Next, the layout of the recesses 5 with respect to the crankshaft 3, and the concrete shape of the recess 5 are described. FIG. 7 is a side view illustrating a full counter type crankshaft 3 for the in-series four-cylinder engine, with the layout of the recesses 5 to the crank journal 31 being added. FIGS. 8A to 8C are side views illustrating the concrete example of the crank journal 31 having the recesses 5.

One or two recesses 5 are disposed at each of the first to fifth crank journals 31A-31E provided to the crankshaft 3. In detail, as for the first crank journal 31A which is located axially outward (F-side) of the disposed location of the #1 cylinder 2 at the F-side end in the cylinder arrangement direction, the first counterweight 33A (end counterweight) extends radially outward from the axially inward end part (R-side end part 31r). FIG. 8A is a side view of a single first crank journal 31A. In the first crank journal 31A, one recess 5 (arrangement end recess) is formed at the part corresponding to the extended position of the first counterweight 33A. The recess 5 is depressed toward the axially center part (F-side) from the R-side end part 31r. The recess 5 has a shape where it is the deepest in the R-side end part 31r and becomes gradually shallower to the F-side.

As for the fifth crank journal 31E which is located axially outward (R-side) of the disposed location of the #4 cylinder 2 at the R-side end in the cylinder arrangement direction, the recess 5 is disposed symmetrically with the first crank journal 31A. In the fifth crank journal 31E, the eighth counterweight 33H (end counterweight) extends radially outward from the axially inward end (F-side end part 31f). In the fifth crank journal 31A, one recess 5 (arrangement end recess) is formed at a part corresponding to the extended position of the eighth counterweight 33H.

Thus, as for the first (fifth) crank journal 31A (31E) provided only with one counterweight 33A (33H), only one recess 5 corresponding to the counterweight 33A (33H) is formed. Therefore, since the large clearance is not unnecessarily formed between the crank journals 31A and 31E and the journal metal 43, the lubrication can be secured, and the wear of the crank journals 31A and 31E can be prevented.

As for the second crank journal 31B, the second counterweight 33B extends radially outward from the F-side end part 31f, and the third counterweight 33C extends radially outward from the R-side end part 31r, at mutually 180° different phase in the circumferential direction. FIG. 8B is a side view of a single second crank journal 31B. The second crank journal 31B has two recesses 5. That is, one recess 5 (first recess) is depressed toward the axial center from the F-side end part 31f corresponding to the extended position of the second counterweight 33B. Further, another recess 5 (second recess) is depressed toward the axial center from the R-side end part 31r corresponding to the extended position of the third counterweight 33C. The fourth crank journal 31D is also provided with two recesses 5 similar to the second crank journal 31B.

As for the third crank journal 31C, the fourth counterweight 33D extends radially outward from the F-side end part 31f, and the fifth counterweight 33E from the R-side end part 31r at the same circumferential position. FIG. 8C is a side view of a single third crank journal 31C. The third crank journal 31C also has two recesses 5. That is, one recess 5 (first recess) is depressed toward the axial center from the F-side end part 31f corresponding to the extended position of the fourth counterweight 33D. Further, another recess 5 (second recess) is depressed toward the axial center from the R-side end part 31r corresponding to the extended position of the fifth counterweight 33E.

Figure 9:
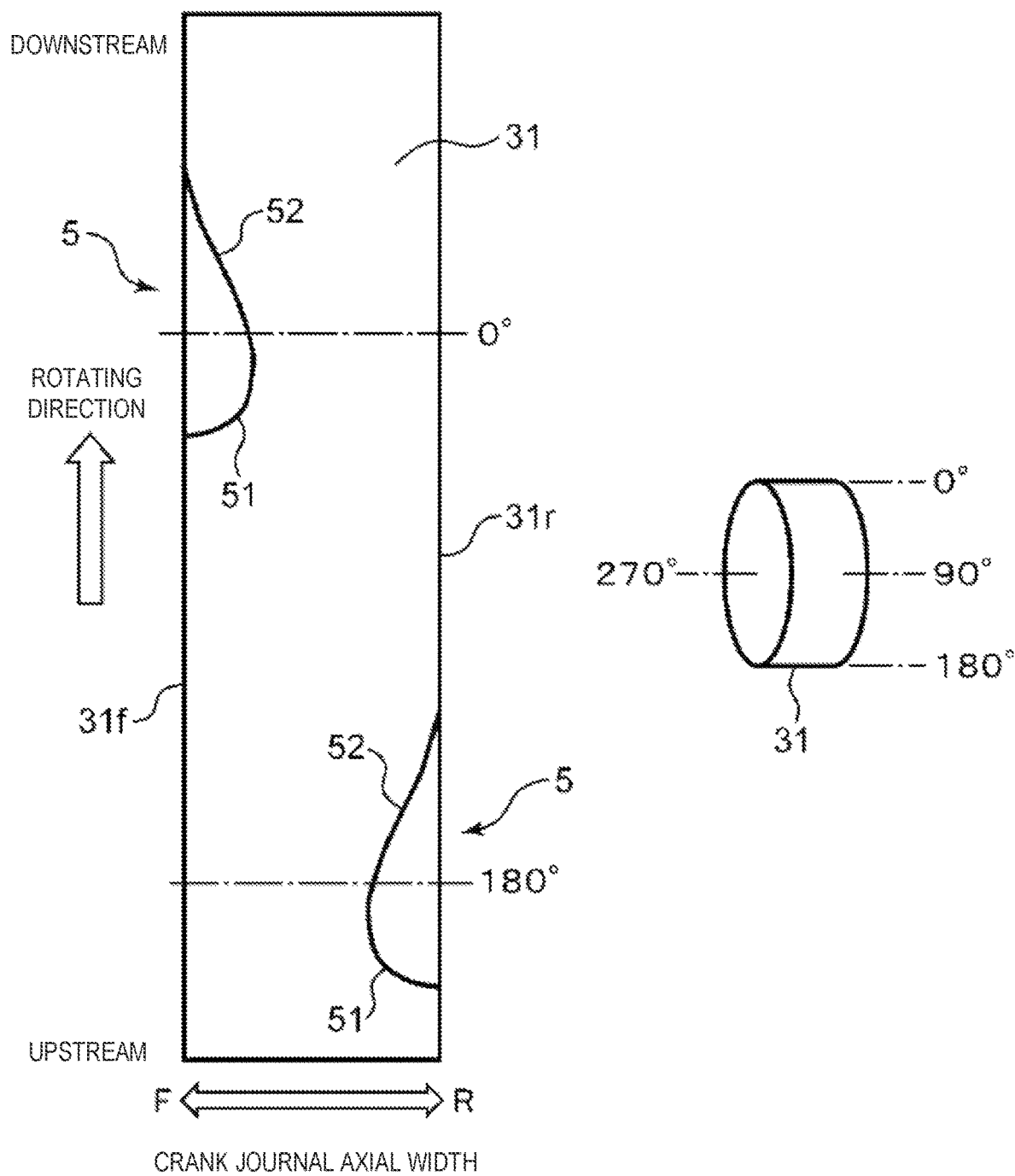
FIG. 9 is a developed view of the surface of the crank journal, illustrating an axial profile of the recess.

Next, the concrete shape of the recess 5 is described. FIG. 9 is a developed view of the surface of the crank journal 31 illustrating an axial profile of the recess 5 (i.e., a view illustrating a plane shape in which the crank journal 31 is developed in the circumferential direction). Here, the crank journal 31 is of a type in which two recesses 5 are disposed with the 180° phase difference corresponding to the second crank journal 31B or the fourth crank journal 31D illustrated in FIG. 7.

The recess 5 has a given axial width and a given circumferential width in the axial direction (width direction) in the circumferential direction (rotational direction) of the crank journal 31, respectively. The axial width of the recess 5 has a shape where an upstream part in the rotational direction of the crankshaft 3 is wider than a downstream part. That is, when the shape of the recess 5 in the plan view is divided into two of the upstream side and the downstream side in the rotational direction (synonymous with the first half and the second half in the rotational direction), the recess 5 has a comparatively larger axial width at the upstream side than the downstream side. Note that the axial width is a dimension from the F-side end part 31f or the R-side end part 31r of the crank journal 31 to an axial center side edge of the recess 5. Further, the circumferential width is a dimension of the recess in the rotational direction.

In more detail, in the plan view shape where the crank journal 31 is developed in the circumferential direction, the recess 5 has a droplet shape comprised of a bulged part 51 upstream in the rotational direction, and a gradual-curve part 52 downstream in the rotational direction. The bulged part 51 is a part which is bulged toward the axial center with a tight curve, near the upstream end in the rotational direction of the circumferential width of the recess 5. The gradual-curve part 52 is a part with a gradual curve from the bulged part 51 to the downstream end in the rotational direction of the circumferential width. That is, an axial center edge of the recess 5 has a curve shape in which it rises steeply from the upstream end in the rotational direction with respect to the F-side end part 31f or the R-side end part 31r, reaches a peak position where the width becomes the maximum in an upstream area in the rotational direction, and then gently approaches the F-side end part 31f or the R-side end part 31r.

Such a plan view shape of the recess 5 corresponds to the plan view shape of the high load part PA of the crank journal 31 illustrated in FIG. 5. As described above, the load which acts on the crank journal 31 by the bending of the counterweight 33 has a tendency in which it is larger in the upstream part in the rotational direction than the downstream part at the extended position of the counterweight 33. In detail, it has a tendency in which the largest load is applied near the upstream end in the rotational direction, and the load decreases gradually as it goes toward the downstream end in the rotational direction. Therefore, the high load part PA has the droplet distribution in which the load center of gravity is eccentric to the upstream side in the rotational direction. The axial profile of the recess 5 also has a droplet shape with the width becoming wider on the upstream side in the rotational direction so that the profile meets such a load tendency of the high load part PA. Therefore, the contact between the crank journal 31 and the journal metal 43 can be securely prevented.

Figure 10:
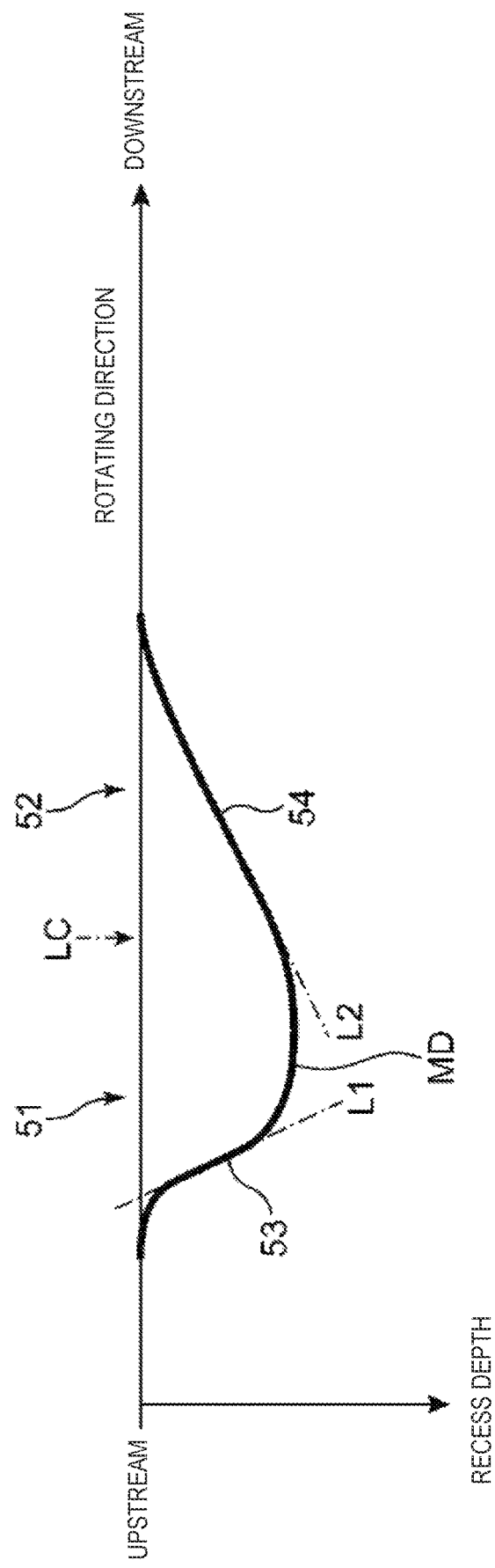
FIG. 10 is a side view of the crank journal, illustrating a depth profile of the recess.

The depression depth of the recess 5 is also set so as to meet the load tendency of the high load part PA. That is, a larger depth of the recess 5 is set at a part of the crank journal 31 to which a larger load is applied. FIG. 10 is a side view of the crank journal 31, illustrating the depth profile of the recess 5 in the rotational direction. This profile is a depth profile of the recess 5 in the F-side end part 31f or the R-side end part 31r. Note that this profile also exaggerates its size in the depth direction.

The recess 5 includes, in the depression shape, an upstream inclined part 53 located upstream in the rotational direction, and a downstream inclined part 54 located downstream in the rotational direction. The upstream inclined part 53 has a slope which becomes deeper at a first inclination L1 in a direction from the upstream end in the rotational direction of the circumferential width of the recess 5 toward a center part LC in the rotational direction. A deepest part MD of the recess 5 is located upstream of the center part LC in the rotational direction. The downstream inclined part 54 has a slope which becomes shallower at a second inclination L2 from the deepest part MD toward the downstream end in the rotational direction. A relationship between the first inclination L1 and the second inclination L2 is L1>L2, when both the inclinations are oriented in the same direction. That is, the recess 5 has the depression shape in which it becomes deeper steeply at the upstream side in the rotational direction, and becomes shallower gently at the downstream side of the deepest part MD. For example, when L1 and L2 are compared in an angle to the tangent of the circumferential surface of the crank journal 31, L1 is about 1.2 to 3 times of L2.

According to the present inventors' analysis, energy loss due to the direct contact between the crank journal 31 and the journal metal 43 accompanying the deformation of the crankshaft 3 presents a characteristic in which it rises comparatively steeply during the first half of the contact, and descends comparatively gently in the second half. Since the direct contact becomes a factor of the wear of the crank journal 31, the wear is large in the first half of the contact and small in the second half. Therefore, by forming in the crank journal 31 the recess 5 having the depth profile provided at the first inclination L1 and the second inclination L2, it can be a measure against the contact wear adapted to the energy loss characteristic.

If the depth profile in the rotational direction of the recess 5 is associated with the axial profile illustrated in FIG. 9, it becomes a relationship in which the depth at the axial end part (the F-side end part 31f or the R-side end part 31r) of the recess 5 is deeper as the axial width of the recess 5 becomes wider. Note that the depth profile in the axial direction is similar to the basic example illustrated in FIGS. 6A and 6B in that the recess 5 has the depth becoming gradually deeper from the axial center part (droplet edge) toward the F-side end part 31f or the R-side end part 31r.

That is, the depth profile of the recess 5 is set so that the depth is comparatively deep in the part where the load is large, and comparatively shallow in the part where the load is small, in accordance with the load distribution of the high load part PA. According to this embodiment, the part of the recess 5 with the wide axial width and the deep depression is disposed at the part of the crank journal 31 where it receives the largest bending load from the counterweight 33. Therefore, the wear due to the contact of the crank journal 31 with the journal metal 43 can be securely avoided.

Modifications

As described above, although the embodiment of the present disclosure is described, the present disclosure is not limited to the above embodiment, and may take the following modified embodiments.

(1) In the above embodiment, the crankshaft 3 having the full counter type counterweight 33 is illustrated. The crankshaft 3 may be of a half counter type. If the crankshaft 3 illustrated in FIG. 7 is modified to the half counter type, the third, fifth, and seventh counterweights 33C, 33E, and 33G are omitted, for example. Also in such a half counter type crankshaft 3, the recess 5 may be provided to the first to fifth crank journals 31A-31E at similar locations to FIG. 7. Note that in the part where the counterweight is omitted, the axial width, the circumferential width, and the depression depth of the recess 5 may be set small, or the formation of the recess 5 itself may be omitted.

Figure 11:
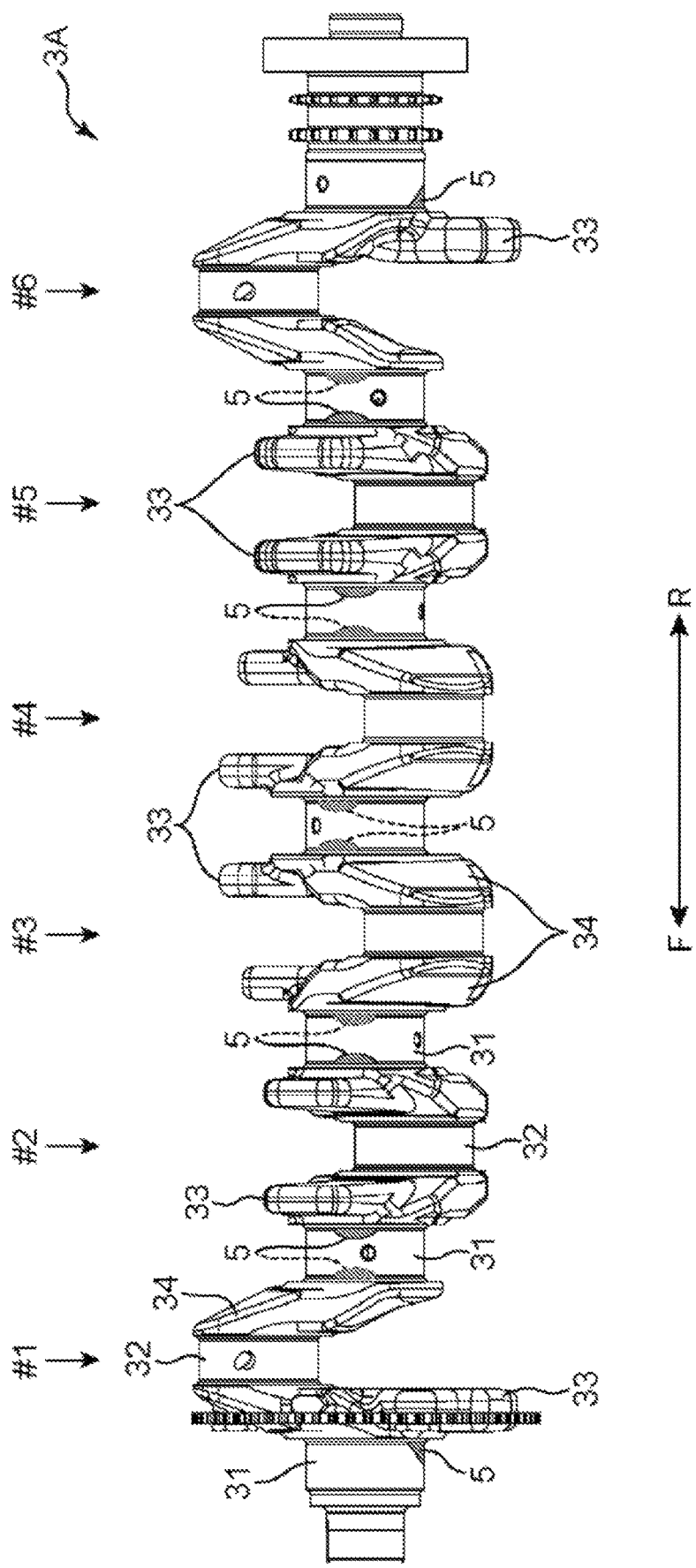
FIG. 11 is a side view of a crankshaft of a 6-cylinder engine.

(2) In the above embodiment, the crankshaft 3 corresponding to the in-series four-cylinder engine 1 is illustrated. FIG. 11 is a side view illustrating a full counter type crankshaft 3A corresponding to an in-series six-cylinder engine 1. The crankshaft 3A for the in-series six-cylinder type is similar in the layout of the recess 5 to the crankshaft 3 described above. The recess 5 is formed in the part corresponding to the extended position of the counterweight 33 of each crank journal 31. Note that the recesses 5 illustrated by two-dot chain lines in FIG. 11 are illustrated as being disposed at the back side of the appeared-at-front part of the crank journals 31.

Figure 12A:
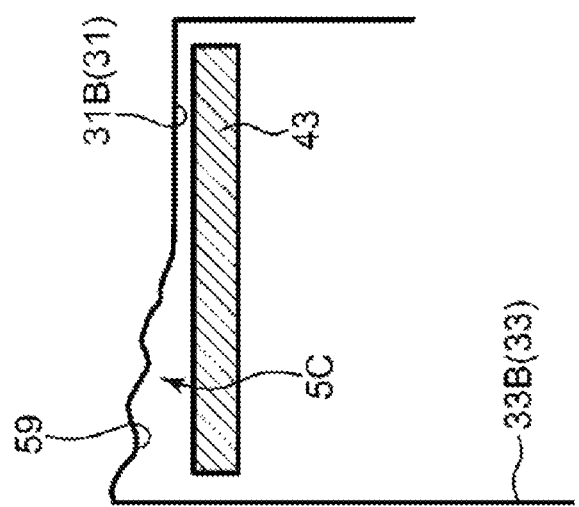
FIGS. 12A to 12C are outline cross-sectional views illustrating modifications of the recess.
Figure 12B:
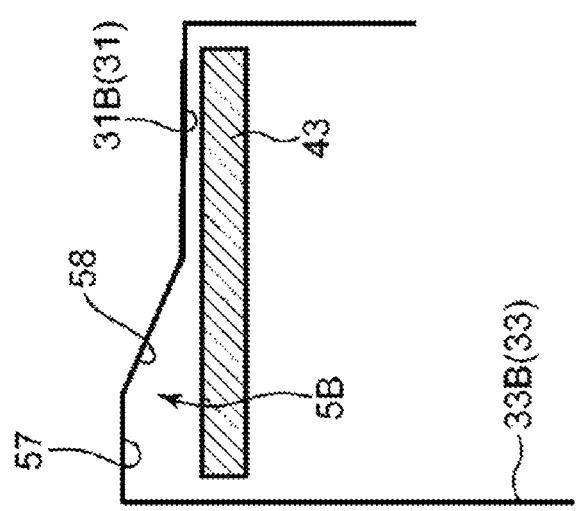
Figure 12C:
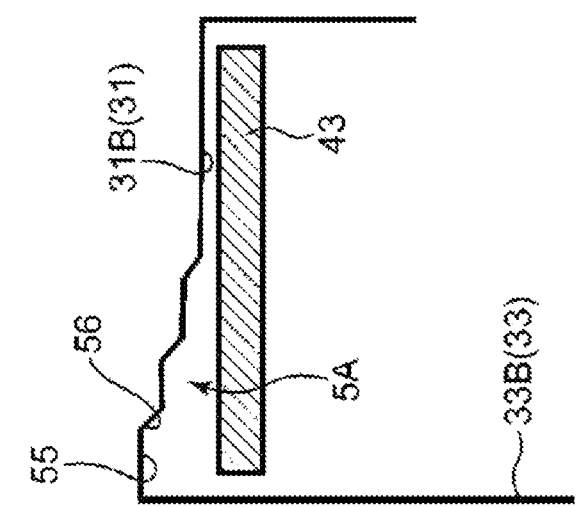

(3) In the above embodiment, the recess 5 is illustrated as having the depth which becomes gradually deeper from the axial center part of the crank journal 31 toward the axial end part (the F-side end part 31f or the R-side end part 31r). The recess 5 may take various modified embodiments, as long as it satisfies the relationship that the axial end part of the crank journal 31 is deeper than the axial center part. FIGS. 12A to 12C illustrate recesses 5A, 5B, and 5C according to modifications.

FIG. 12A is an outline cross-sectional view of the second crank journal 31B illustrating the recess 5A having a stair-type depression shape. The recess 5A has a depression shape in which horizontal parts 55 with no inclination, and downslope parts 56 which incline downwardly continue alternately, and the axial end part of the second crank journal 31B is deeper in the depression depth than the axial center part. FIG. 12B illustrates the recess 5B which is comprised of one horizontal part 57 and one downslope part 58. The downslope part 58 is disposed at the axial center part of the second crank journal 31B, and the horizontal part 57 extends from the deepest end of the downslope part 58 to the axial end part. FIG. 12C illustrates the recess 5C having a concavo-convex inclined part 59. The concavo-convex inclined part 59 is an inclined part of which the depth becomes deeper as the whole from the axial center part of the second crank journal 31B to the axial end part, while repeating a concave and a convex. Such recesses 5A, 5B, and 5C also have similar operation and effects as the recess 5 described above.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

Description Of Reference Characters

1 Engine (Internal Combustion Engine)
10 Engine Body
2 Cylinder
21 Piston
22 Connecting Rod
3 Crankshaft
31, 31A-31E Crank Journal
31f F-side End Part (One End Part in Axial Direction)
31r R-side End Part (Other End Part in Axial Direction)
33 Counterweight
33A First Counterweight (End Counterweight)
33H Eighth Counterweight (End Counterweight)
4 Main Bearing
43 Journal Metal (Bearing Member)
5, 5A, 5B, 5C Recess
51 Bulged Part
52 Gradual-curve Part
53 Upstream Inclined Part
54 Downstream Inclined Part
55 Horizontal Part
56 Downslope Part
57 Horizontal Part
58 Downslope Part
59 Concavo-convex Inclined Part

What is claimed is:

1. An internal combustion engine, comprising:
   an engine body provided with a cylinder and a piston reciprocatably accommodated in the cylinder;
   a crankshaft that converts reciprocating movement of the piston into rotational movement; and
   a bearing member pivotally supporting the crankshaft via lubricating oil,
   wherein the crankshaft includes a crank journal pivotally supported by the bearing member, and a counterweight extending radially outward from an axial end part of the crank journal,
   wherein the crank journal has a recess formed in a part thereof corresponding to an extended position of the counterweight, the recess being depressed radially inwardly, and
   wherein the recess is deeper at the axial end part of the crank journal than an axial center part.

2. The internal combustion engine of claim 1, wherein the recess becomes gradually deeper from the axial center part of the crank journal toward the axial end part.

3. The internal combustion engine of claim 2,
   wherein the recess has a given axial width and a given circumferential width in the axial direction and in the circumferential direction of the crank journal, respectively, and
   wherein the axial width of the recess is wider at an upstream side in a rotational direction of the crankshaft than at a downstream side.

4. The internal combustion engine of claim 3, wherein a plan view shape of the recess in a plane in which the crank journal is developed in the circumferential direction has a bulged part bulged toward the axial center part with a tight curve near an upstream end in the rotational direction of the circumferential width, and a gradual-curve part with a gradual curve from the bulged part to a downstream end in the rotational direction of the circumferential width.

5. The internal combustion engine of claim 4, wherein the recess is deeper in the axial end part as the axial width becomes wider.

6. The internal combustion engine of claim 5,
   wherein the recess has a given axial width and a given circumferential width in the axial direction and in the circumferential direction of the crank journal, respectively, and
   wherein the recess has a depth profile in which the depth becomes deeper at a first inclination from the upstream end in the rotational direction of the circumferential width toward the downstream side, a deepest part is formed upstream of the center part in the rotational direction, and the depth becomes shallower at a second inclination from the deepest part toward the downstream end in the rotational direction, the first inclination being larger than the second inclination.

7. The internal combustion engine of claim 6,
   wherein the engine has a plurality of cylinders lined up in a given arrangement direction,
   wherein the crank journal located between two cylinders includes:
      a first counterweight extending radially outward from one end part in the axial direction;
      a second counterweight extending radially outward from the other end part in the axial direction, at a position opposite from or at the same position as the first counterweight in the circumferential direction;
      a first recess formed in a part corresponding to the extended position of the first counterweight, and depressed from one end part in the axial direction toward the center in the axial direction; and
      a second recess formed in a part corresponding to the extended position of the second counterweight, and depressed from the other end part in the axial direction toward the center in the axial direction.

8. The internal combustion engine of claim 6,
   wherein the engine has a plurality of cylinders lined up in a given arrangement direction, and
   wherein the crank journal located axially outward of the cylinder on the one end side or the other end side in the arrangement direction includes:
      an end counterweight extending radially outward from an inward end in the axial direction; and
      an arrangement end recess formed in a part corresponding to the extended position of the end counterweight, and depressed outward in the axial direction from the inward end.

9. The internal combustion engine of claim 1,
wherein the recess has a given axial width and a given circumferential width in the axial direction and in the circumferential direction of the crank journal, respectively, and
wherein the axial width of the recess is wider at an upstream side in the rotational direction of the crankshaft than at a downstream side.

10. The internal combustion engine of claim 1,
wherein the recess has a given axial width and a given circumferential width in the axial direction and in the circumferential direction of the crank journal, respectively, and
wherein the recess has a depth profile in which the depth becomes deeper at a first inclination from the upstream end in the rotational direction of the circumferential width toward the downstream side, a deepest part is formed upstream of the center part in the rotational direction, and the depth becomes shallower at a second inclination from the deepest part toward the downstream end in the rotational direction, the first inclination being larger than the second inclination.

11. The internal combustion engine of claim 1,
wherein the engine has a plurality of cylinders lined up in a given arrangement direction,
wherein the crank journal located between two cylinders includes:
   a first counterweight extending radially outward from one end part in the axial direction;
   a second counterweight extending radially outward from the other end part in the axial direction, at a position opposite from or at the same position as the first counterweight in the circumferential direction;
   a first recess formed in a part corresponding to the extended position of the first counterweight, and depressed from one end part in the axial direction toward the center in the axial direction; and
   a second recess formed in a part corresponding to the extended position of the second counterweight, and depressed from the other end part in the axial direction toward the center in the axial direction.

12. The internal combustion engine of claim 1,
wherein the engine has a plurality of cylinders lined up in a given arrangement direction, and
wherein the crank journal located axially outward of the cylinder on the one end side or the other end side in the arrangement direction includes:
   an end counterweight extending radially outward from an inward end in the axial direction; and
   an arrangement end recess formed in a part corresponding to the extended position of the end counterweight, and depressed outward in the axial direction from the inward end.

13. The internal combustion engine of claim 2,
wherein the recess has a given axial width and a given circumferential width in the axial direction and in the circumferential direction of the crank journal, respectively, and
wherein the recess has a depth profile in which the depth becomes deeper at a first inclination from the upstream end in the rotational direction of the circumferential width toward the downstream side, a deepest part is formed upstream of the center part in the rotational direction, and the depth becomes shallower at a second inclination from the deepest part toward the downstream end in the rotational direction, the first inclination being larger than the second inclination.

14. The internal combustion engine of claim 2,
wherein the engine has a plurality of cylinders lined up in a given arrangement direction,
wherein the crank journal located between two cylinders includes:
   a first counterweight extending radially outward from one end part in the axial direction;
   a second counterweight extending radially outward from the other end part in the axial direction, at a position opposite from or at the same position as the first counterweight in the circumferential direction;
   a first recess formed in a part corresponding to the extended position of the first counterweight, and depressed from one end part in the axial direction toward the center in the axial direction; and
   a second recess formed in a part corresponding to the extended position of the second counterweight, and depressed from the other end part in the axial direction toward the center in the axial direction.

15. The internal combustion engine of claim 2,
wherein the engine has a plurality of cylinders lined up in a given arrangement direction, and
wherein the crank journal located axially outward of the cylinder on the one end side or the other end side in the arrangement direction includes:
   an end counterweight extending radially outward from an inward end in the axial direction; and
   an arrangement end recess formed in a part corresponding to the extended position of the end counterweight, and depressed outward in the axial direction from the inward end.

16. The internal combustion engine of claim 9,
wherein the recess has a given axial width and a given circumferential width in the axial direction and in the circumferential direction of the crank journal, respectively, and
wherein the recess has a depth profile in which the depth becomes deeper at a first inclination from the upstream end in the rotational direction of the circumferential width toward the downstream side, a deepest part is formed upstream of the center part in the rotational direction, and the depth becomes shallower at a second inclination from the deepest part toward the downstream end in the rotational direction, the first inclination being larger than the second inclination.

17. The internal combustion engine of claim 9,
wherein the engine has a plurality of cylinders lined up in a given arrangement direction,
wherein the crank journal located between two cylinders includes:
   a first counterweight extending radially outward from one end part in the axial direction;
   a second counterweight extending radially outward from the other end part in the axial direction, at a position opposite from or at the same position as the first counterweight in the circumferential direction;
   a first recess formed in a part corresponding to the extended position of the first counterweight, and depressed from one end part in the axial direction toward the center in the axial direction; and
   a second recess formed in a part corresponding to the extended position of the second counterweight, and depressed from the other end part in the axial direction toward the center in the axial direction.

18. The internal combustion engine of claim 9,
wherein the engine has a plurality of cylinders lined up in a given arrangement direction, and wherein the crank journal located axially outward of the cylinder on the one end side or the other end side in the arrangement direction includes:
- an end counterweight extending radially outward from an inward end in the axial direction; and
- an arrangement end recess formed in a part corresponding to the extended position of the end counterweight, and depressed outward in the axial direction from the inward end.

19. The internal combustion engine of claim 4,
wherein the recess has a given axial width and a given circumferential width in the axial direction and in the circumferential direction of the crank journal, respectively, and
wherein the recess has a depth profile in which the depth becomes deeper at a first inclination from the upstream end in the rotational direction of the circumferential width toward the downstream side, a deepest part is formed upstream of the center part in the rotational direction, and the depth becomes shallower at a second inclination from the deepest part toward the downstream end in the rotational direction, the first inclination being larger than the second inclination.

20. The internal combustion engine of claim 4,
wherein the engine has a plurality of cylinders lined up in a given arrangement direction,
wherein the crank journal located between two cylinders includes:
- a first counterweight extending radially outward from one end part in the axial direction;
- a second counterweight extending radially outward from the other end part in the axial direction, at a position opposite from or at the same position as the first counterweight in the circumferential direction;
- a first recess formed in a part corresponding to the extended position of the first counterweight, and depressed from one end part in the axial direction toward the center in the axial direction; and
- a second recess formed in a part corresponding to the extended position of the second counterweight, and depressed from the other end part in the axial direction toward the center in the axial direction.

* * * * *